(No Model.)
G. W. STOKER.
ADJUSTABLE BOX COVER.
No. 518,554.  Patented Apr. 17, 1894.
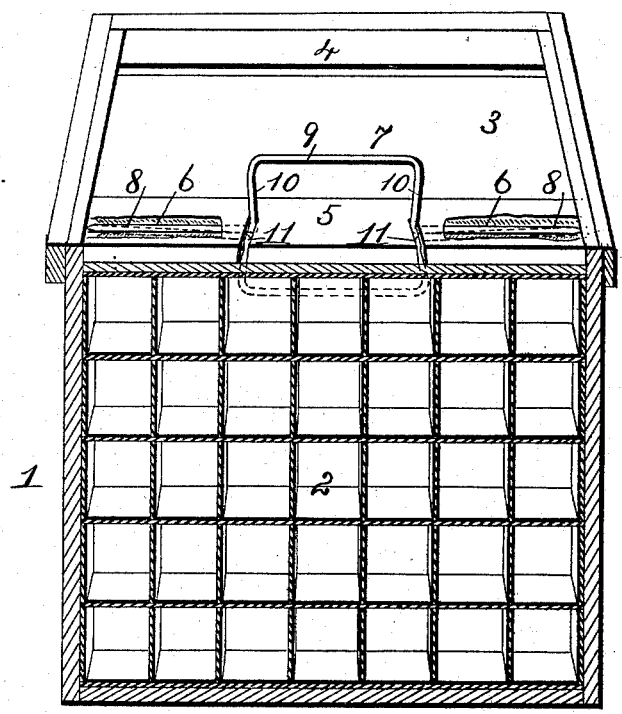
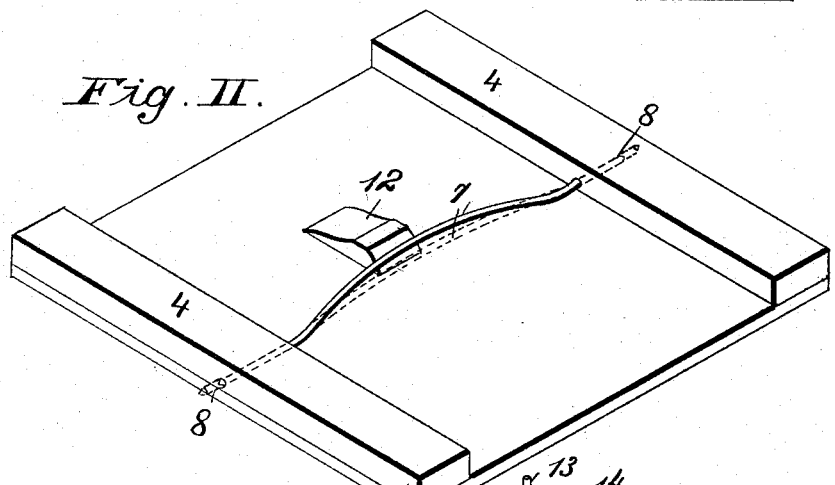
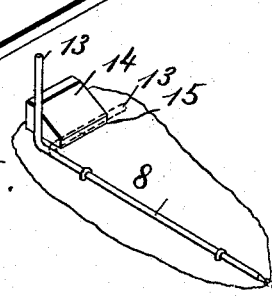
WITNESSES:
F. G. Fischer
Walter Allen
INVENTOR:
Geo. W. Stoker
By _____
ATTYS.

# UNITED STATES PATENT OFFICE.

GEORGE W. STOKER, OF KANSAS CITY, MISSOURI, ASSIGNOR TO ORRIN L. HULBERT, OF SAME PLACE.

ADJUSTABLE BOX-COVER.

SPECIFICATION forming part of Letters Patent No. 518,554, dated April 17, 1894.

Application filed April 27, 1893. Serial No. 472,031. (No model.)

*To all whom it may concern:*

Be it known that I, GEORGE W. STOKER, of Kansas City, in the county of Jackson and State of Missouri, have invented certain new and useful Improvements in Adjustable Box-Covers, of which the following is a full, clear, and exact description, reference being had to the accompanying drawings, which form a part of this specification.

My invention relates to certain new and useful improvements in box covers, which may be used in connection with ordinary boxes, egg cases, or similar articles; and my invention consists in certain features of novelty hereinafter described and pointed out in the claims.

Figure I. is part in perspective, and part a vertical section, and also part broken away of an egg case with my improvement shown therewith. Fig. II, is an enlarged perspective of the cover showing a slight modification of the wire for securing the lid. Fig. III, is a detail section showing still another modification of the lid securing device.

Referring to the drawings: 1, represents a box or egg case having the usual fillers 2.

3, represents a lid which may be provided with cross-pieces 4, or not, as may be desired.

In Fig. I, I have shown a central cross-piece 5, secured to the lid, said cross-piece having longitudinally extending openings 6, at each side of its center.

7, represents a bail located near the center of the lid or cover, said bail or handle having laterally extending prongs or horizontal portions 8, working in the openings of the cross-piece 5, the bail or handle 7, which is made of a wire rod, having a horizontal portion 9, and vertical portions 10, said vertical portions connecting with the prongs or horizontal portions 8. The vertical portions 10, of the bail, work in oblique openings 11, in the cross-piece 5, said openings providing inclined faces running at an angle with the straight edge of the cross-piece converging toward each other so that as the bail is pressed up into the position shown in Fig. I, the inclined faces of the cross-piece 5, will cause the prongs 8, to be withdrawn from the sides of the box and the lid 6, released. In pressing the prongs into the sides of the box in order to secure the lid the bail 7, is pressed down-ward into the position shown in dotted lines Fig. I, thus pressing the prongs outward and into the sides of the box, thus holding the lid securely at any desired point. For instance, if it is desired to fill a portion of an egg case with eggs, only a portion of the fillers are placed in position, the lid can be secured at any place in the case or box so as to bear tightly against the top of the fillers and thus prevent shifting or damage to the matter contained within the box or case, the prongs readily entering into the sides of the case, but not forming a sufficient recess therein to damage the sides of the same.

In Fig. II, I have shown a slight modification, the bail or handle 7, being bow-shaped, and the prongs 8, extending through the cross slats 4, the bail 7, being of spring construction when pressed down against an inclined face such as the cleat 12, on the cover, the prongs are pressed outward through the cross strips 4, and enter the sides of the box.

In Fig. III, I show a modification which may be used on longer boxes in which the prong 8, is provided with a right-angle handle portion 13, corresponding with the portion 10 of the handle 7.

14, represents a beveled block against the inclined face of which the handle portion 13, of the fastener is forced, thus pressing the spring fastener into the sides of the box, the the handle portion 13, being held in its set position by being forced down and resting against the square portion 15, of the beveled block 14.

I do not confine myself to the special construction of block or cam having an inclined face as shown for forcing the prongs into the sides of the box, as it will be seen that any form of beveled projection, or an inclined slot in a cross-bar or other projection, or a cam-shaped surface on the box would perform this function.

I claim as my invention—

1. The combination, with an adjustable box-cover; of a block, fixed to the top thereof, having an inclined face, a prong, formed of a single piece of wire pointed at its outer end, having a handle in one piece therewith, by which the outer end is projected beyond the edge of the box-cover so as to engage the body of the receptacle, and means whereby the prong is guided in its movement; the handle being pressed on the inclined face of the block for moving the prong outward; substantially as described.

2. The combination, with an adjustable box-cover; of a block, fixed to the top thereof, having an inclined face, two prongs formed of a single piece of wire pointed at its outer ends, having a handle in one piece therewith, by which the outer ends are projected beyond the edges of the box-cover so as to engage the body of the receptacle, and means whereby the prongs are guided in their movement; the handle being pressed on the inclined face of the block for moving the prongs outward; substantially as described.

3. The combination, with an adjustable box-cover; of a block, fixed to the top thereof, having inclined faces, two prongs formed of a single piece of wire, pointed at its outer ends, having handles in one piece therewith, by which the outer ends are projected beyond the edges of the box-cover so as to engage the body of the receptacle, and means whereby the prongs are guided in their movement; the handles being pressed on the inclined faces of the block for moving the prongs outward; substantially as described.

4. An adjustable box-cover comprising a cross piece having oblique openings providing inclined faces, and longitudinal openings, and the prongs sliding in the longitudinal openings, having handles, working between the inclined faces of the oblique openings, and connected by a horizontal portion; substantially as described.

GEORGE W. STOKER.

Witnesses:
EDWARD F. BEARD,
JOSEPH J. MASSEY.